United States Patent
Henot et al.

(10) Patent No.: US 12,250,540 B2
(45) Date of Patent: Mar. 11, 2025

(54) DIGITAL VEHICLE IDENTITY NETWORK

(71) Applicant: Accenture Global Solutions Limited, Dublin (IE)

(72) Inventors: Sebastien Jean Bernard Henot, Parker, CO (US); Daniel Bachenheimer, Silver Spring, MD (US); Tracy A. Kuhrt, Apache Junction, AZ (US); Richard T. Meszaros, Westworth Village, TX (US)

(73) Assignee: Accenture Global Solutions Limited, Dublin (IE)

( * ) Notice: Subject to any disclaimer, the term of this patent is extended or adjusted under 35 U.S.C. 154(b) by 488 days.

(21) Appl. No.: 17/412,537

(22) Filed: Aug. 26, 2021

(65) Prior Publication Data

US 2022/0070668 A1 Mar. 3, 2022

Related U.S. Application Data

(60) Provisional application No. 63/070,455, filed on Aug. 26, 2020.

(51) Int. Cl.
*H04W 12/06* (2021.01)
*G06F 16/903* (2019.01)
*H04L 9/40* (2022.01)

(52) U.S. Cl.
CPC ...... *H04W 12/06* (2013.01); *G06F 16/90335* (2019.01); *H04L 63/08* (2013.01)

(58) Field of Classification Search
CPC . H04W 12/06; H04W 12/69; G06F 16/90335; H04L 63/08; H04L 63/12
See application file for complete search history.

(56) References Cited

U.S. PATENT DOCUMENTS

| 11,102,011 | B2 * | 8/2021 | Qiu | H04L 9/3247 |
|---|---|---|---|---|
| 2019/0319808 | A1 * | 10/2019 | Fallah | H04L 9/3239 |
| 2020/0044831 | A1 * | 2/2020 | Soundararajan | H04L 9/50 |
| 2020/0250683 | A1 * | 8/2020 | Padmanabhan | G06Q 20/38215 |
| 2020/0336483 | A1 * | 10/2020 | Murdoch | H04L 9/50 |
| 2022/0036465 | A1 * | 2/2022 | Fields | H04L 9/32 |
| 2022/0158855 | A1 * | 5/2022 | Wentz | H04L 9/3247 |

* cited by examiner

*Primary Examiner* — Michael Simitoski
*Assistant Examiner* — Andrew Suh
(74) *Attorney, Agent, or Firm* — Polsinelli PC (57) ABSTRACT

Methods, systems, and computer-readable storage media for receiving, by an identity network and from a verifying entity, a query including an identifier that uniquely identifies an entity that is active in the mobility network and an attestation that is to be authenticated, resolving, by the identity network, the query to provide a resolved query, the resolved query including the attestation, resolving at least partly including identifying a data source of a plurality of data sources that is to be queried to authenticate the attestation, transmitting, by the identity network, the resolved query to the data source, receiving, by the identity network, a response to the resolved query, and transmitting, by the identity network, the response to the verifying entity.

14 Claims, 6 Drawing Sheets

DIGITAL VEHICLE IDENTITY NETWORK

CROSS-REFERENCE TO RELATED APPLICATION

This application claims priority to and the benefit of U.S. Prov. App. No. 63/070,455, filed on Aug. 26, 2020, and entitled Digital Vehicle Identity Network, the disclosure of which is expressly incorporated herein by reference in the entirety.

BACKGROUND

As technology has advanced the mobility space has drastically changed. For example, in the case of vehicles, such as cars, the mobility space has transitioned across periods that can be broken down and referred to as a raw period, a stamped period, a standardized period, and a connected period up to today's encrypted period. For example, the raw period was absent identification or traceability of vehicles. That is, vehicles were not provided with an individual identity. In the stamped period, non-standard identifiers were assigned to vehicles to support activities, such as traceability, quality management, and accounting. In the standardized period, identifiers were internationally standardized across the vehicle industry. For example, standardized vehicle identification numbers (VINs) were introduced. In this manner, each vehicle had an identity in the form of a unique, standardized VIN. In the connected period, technologies were introduced in vehicles that enabled vehicles to connect with other devices. For example, vehicles became Internet-connected to communicate with other vehicles, systems, and the like. To facilitate this connectivity, vehicles are assigned unique Internet Protocol (IP) addresses and unique media access control (MAC) addresses.

Connected vehicles have presented a host of opportunities in today's encrypted period, which includes vehicles functioning as entities within a mobility ecosystem that includes various applications and services. For example, vehicles can execute and/or be the subject of secure transactions based on their trusted identities. Examples of this can include, without limitation, vehicle registration, title transfer, digital keys, trusted vehicle maintenance, trusted supply chain, service marketplaces (e.g., parking, fueling, recharging, tolls), electric vehicle grid integration, insurance, and financing. For example, an issuing authority (e.g., a department of motor vehicles (DMV)) can issue an attestation associated with the vehicle (e.g., title) and the attestation can be immutably recorded in a distributed ledger system (e.g., recorded in a blockchain). The attestation can be presented for some purpose (e.g., title transfer) and the attestation can be verified by the distributed ledger system (e.g., for trusted title transfer, insurance claim).

However, as the number of issuing authorities and types of attestations have multiplied in the mobility ecosystem technical difficulties and inefficiencies have arisen. For example, attestations are recorded in disparate systems, many systems being specific to respective issuing authorities. Further, standardization of attestations, recording of attestations, and access to attestations is lacking. Consequently, an entity seeking to verify an attestation has to be conversant in and connectable to a multitude of systems and how to connect with and query each system in order to verify attestations.

SUMMARY

Implementations of the present disclosure are generally directed to computer-implemented a digital vehicle identity network. More particularly, implementations of the present disclosure are directed to a digital vehicle identity network that leverages digital twins and digital threads to manage unique, immutable digital identities of entities within a mobility ecosystem and enable interoperability across applications of a mobility ecosystem.

In some implementations, actions include receiving, by an identity network and from a verifying entity, a query including an identifier that uniquely identifies an entity that is active in the mobility network and an attestation that is to be authenticated, resolving, by the identity network, the query to provide a resolved query, the resolved query including the attestation, resolving at least partly including identifying a data source of a plurality of data sources that is to be queried to authenticate the attestation, transmitting, by the identity network, the resolved query to the data source, receiving, by the identity network, a response to the resolved query, and transmitting, by the identity network, the response to the verifying entity. Other implementations of this aspect include corresponding systems, apparatus, and computer programs, configured to perform the actions of the methods, encoded on computer storage devices.

These and other implementations can each optionally include one or more of the following features: resolving the query further includes determining from a sub-governance framework of a set of sub-governance frameworks within the identity network; each sub-governance framework corresponds to an issuing authority that issues attestations representing activities within the mobility network; the identity network stores a digital twin of the entity, the digital twin recording a history of the entity; the identifier conforms to the vehicle identity (VID) standard; the data source includes a distributed ledger system that records data associated with the attestation to authenticate the attestation; and the identifier includes a decentralized identifier (DID) that is stored in a distributed ledger of the identity network.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference symbols in the various drawings indicate like elements.

DETAILED DESCRIPTION

Implementations of the present disclosure are generally directed to a computer-implemented digital vehicle identity network. More particularly, implementations of the present disclosure are directed to a digital vehicle identity network that leverages digital twins and digital threads to manage unique, immutable digital identities of entities within a mobility ecosystem and enable interoperability across applications of a mobility ecosystem. In some examples, entities include natural persons, legal persons (e.g., companies, government bureaus), things (e.g., vehicles, parts, materials), and processes (e.g., supply chain management). In the context of the present disclosure, vehicles (entities) are each assigned a unique digital identifier that is processable by the digital vehicle identity network to authenticate transactions and/or attestations involving the vehicles. In some examples, entities (e.g., vehicles, owners) are associated with a digital wallet that stores data representing the entity, other entities, transactions, and/or attestations.

In some implementations, actions include receiving, by an identity network and from a verifying entity, a query including an identifier that uniquely identifies an entity that is active in the mobility network and an attestation that is to be authenticated, resolving, by the identity network, the query to provide a resolved query, the resolved query including the attestation, resolving at least partly including identifying a data source of a plurality of data sources that is to be queried to authenticate the attestation, transmitting, by the identity network, the resolved query to the data source, receiving, by the identity network, a response to the resolved query, and transmitting, by the identity network, the response to the verifying entity.

To provide context for implementations of the present disclosure, and as introduced above, connected vehicles have presented a host of opportunities in today's encrypted period, which includes vehicles functioning as entities within a mobility ecosystem that includes various applications and services. For example, vehicles can execute and/or be the subject of secure transactions based on their trusted identities. Examples of this can include, without limitation, vehicle registration, title transfer, digital keys, trusted vehicle maintenance, trusted supply chain, service marketplaces (e.g., parking, fueling, recharging, tolls), electric vehicle grid integration, insurance, and financing. For example, an issuing authority (e.g., a department of motor vehicles (DMV)) can issue an attestation associated with the vehicle (e.g., title) and the attestation can be immutably recorded in a distributed ledger system (e.g., recorded in a blockchain). The attestation can be presented for some purpose (e.g., title transfer) and the attestation can be verified by the distributed ledger system (e.g., for trusted title transfer, insurance claim).

However, as the number of issuing authorities and types of attestations have multiplied in the mobility ecosystem technical difficulties and inefficiencies have arisen. For example, attestations are recorded in disparate systems, many systems being specific to respective issuing authorities. Further, standardization of attestations, recording of attestations, and access to attestations is lacking. Consequently, an entity seeking to verify an attestation has to be conversant in and connectable to a multitude of systems and how to interoperate with each system in order to verify attestations.

For example, an original equipment manufacturer (OEM) (issuing authority) that produces vehicles can issue a proof of ownership that is digitally recorded (as an attestation) in a system (e.g., a centralized database system maintained by the OEM). A governmental agency (e.g., DMV) can issue a title to the vehicle and the title can be digitally recorded (as an attestation) in another system (e.g., a distributed ledger system operated by the government agency). An insurance company can issue an insurance policy on the vehicle and the insurance policy can be recorded (as an attestation) in yet another system (e.g., a distributed ledger system operated by the insurance company). A repair facility can conduct maintenance on the vehicle and provide a vehicle maintenance log that can be recorded (as an attestation) in still another system (e.g., a centralized database system maintained by the repair facility).

Continuing with the above example, an ownership transfer of the vehicle can require verifying each of the attestations. For example, a seller of the vehicle can present each attestation as a verifiable claim (e.g., to verify that the vehicle is the vehicle as produced by the OEM, to verify the chain of title to the vehicle, to verify continuity of insurance, and to verify a maintenance history of the vehicle). A purchaser of the vehicle can verify each attestation by querying the system for each respective attestation. To achieve this, the purchaser must make multiple calls to disparate systems and each call has to be in the format and conform to the protocol of the respective systems. Consequently, such a traditional approach in verification of attestations introduces technical inefficiencies and hinders the overall interoperability within the mobile ecosystem.

In view of the above context, and as described in further detail herein, the digital vehicle identity network (DVIN) of the present disclosure (also referred to herein as the identity network or the vehicle identity network) provides a robust identity solution in the vehicle (mobility) space and functions as a bridge between entities, such as issuing authorities and verifying entities, and systems, in which attestations are recorded. More particularly, the DVIN of the present disclosure enables and supports ecosystem-based services that execute secure transactions between entities using underlying, immutable identities and enables resource-efficient interoperability within the mobile ecosystem.

To provide further context for the following discussion of implementations of the present disclosure, distributed ledger systems and digital twins are described.

Distributed ledger technologies provide a shared truth for all participants represented by partner systems of a distributed ledger network. The distributed ledger network maintains a distributed ledger that is considered a single source of truth for data stored therein. A common distributed ledger network is the blockchain network, which maintains a distributed ledger referred to as blockchain. The blockchain network is associated with the Bitcoin cryptocurrency. However, and as described herein with reference to the DVIN of the present disclosure, distributed ledger networks can be leveraged outside of the cryptocurrency context. Further, although the term blockchain is generally associated with cryptocurrency networks, blockchain is used herein to generally refer to a distributed ledger without reference to any particular use case.

In general, a distributed ledger network may be made up of peer-to-peer nodes, and enables participating entities corresponding to partner systems to securely, and immutably conduct transactions and store data. A blockchain is made up of a chain of blocks, each block storing data. Example data includes data representative of a data object created in relation to interactions between two or more participants. While data objects are used herein by way of non-limiting example, it is contemplated that any appropriate data can be stored in a blockchain (e.g., documents, images, videos, audio). Information stored to the blockchain may be represented as hash values. The hash values are generated and stored by executing transactions within the distributed ledger network. Once stored in the blockchain, the data is considered to be immutable. That is, the hash values stored in the blockchain cannot be changed. Accordingly, a blockchain (distributed ledger) can be described as a data structure that stores data in a way that the data is immutable and can be verified. Each block in the blockchain is an aggregate of multiple transactions and is linked to a previous block immediately before it in the blockchain by including a cryptographic hash of the previous block. A block also includes a timestamp, its own cryptographic hash, and data.

Whereas a blockchain is a data structure for storing transactions, a distributed ledger network is a network of computing nodes that manage, update, and maintain one or more blockchains. A blockchain constantly grows as completed blocks are added with a new set of transactions. In some examples, a single block (or block node) is provided from one or more transactions. Blocks may be added to the blockchain in a linear, chronological order by one or more computing devices in a peer-to-peer network of interconnected computing devices that execute a consensus protocol. The peer-to-peer network can be described as a plurality of interconnected nodes, each node being a computing device that uses a client to validate and relay transactions (e.g., resource transfers, data object manipulations). Each node maintains a copy of the blockchain, which is automatically downloaded to the node upon joining the peer-to-peer network. A consensus protocol provides a secure and reliable method of updating the blockchain, copies of which are distributed across the peer-to-peer network, without the need for a central authority.

A digital twin can be described as a virtual model of processes, products, people, places, systems, devices, services or states of any real-world entity. A digital twin can be connected to the real object using a digital thread. The digital twin can contain historical, present and future information and associations of the modeled entities to, in the context of the present disclosure, support recording and verification of attestations associated with the real-world entity. This pairing of the virtual and physical worlds through the digital thread enables the digital twin to function as an accurate and up-to-date representation of a respective real-world entity.

Figure 1:
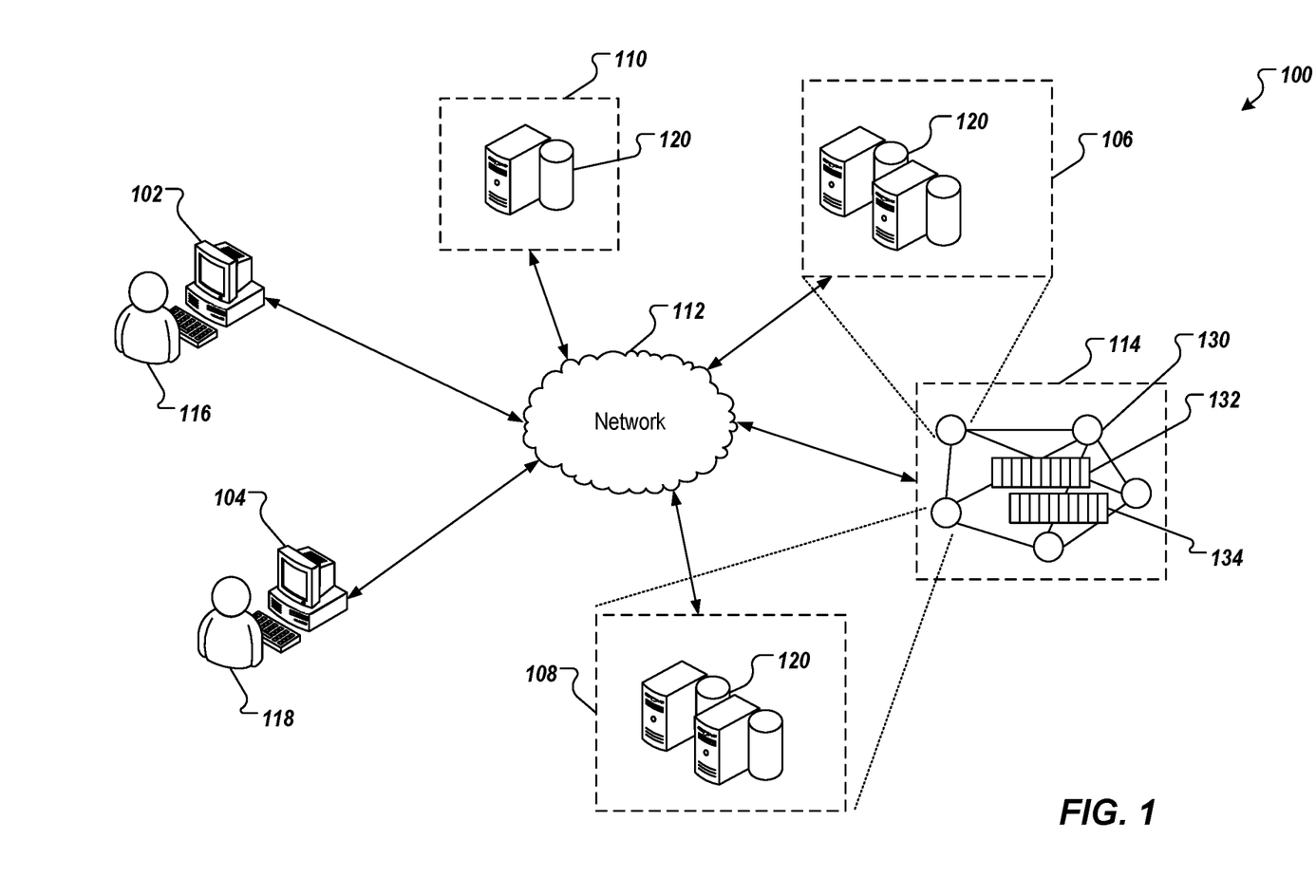
FIG. 1 depicts an example environment that can execute implementations of the present disclosure.

FIG. 1 depicts an example environment 100 that can execute implementations of the present disclosure. In some examples, the example environment 100 enables users associated with respective entities of a mobility ecosystem (e.g., original equipment manufacturers (OEMs), governmental agencies, insurance enterprises, financing enterprises) to manage (e.g., create, execute, close) data objects (e.g., contracts, business objects) between entities created by corresponding software system in a technology platform. The example environment 100 includes computing devices 102, 104, back-end systems 106, 108, 110, a network 112, and a blockchain network 114 (e.g., consortium blockchain network). In some examples, the computing devices 102, 104 are used by respective users 116, 118 to log into and interact with the platforms and running applications according to implementations of the present disclosure.

In the depicted example, the computing devices 102, 104 are depicted as desktop computing devices. It is contemplated, however, that implementations of the present disclosure can be realized with any appropriate type of computing device (e.g., smartphone, tablet, laptop computer, voice-enabled devices). In some examples, the network 112 includes a local area network (LAN), wide area network (WAN), the Internet, or a combination thereof, and connects web sites, user devices (e.g., computing devices 102, 104), and back-end systems (e.g., the back-end systems 106, 108, 110). In some examples, the network 112 can be accessed over a wired and/or a wireless communications link. For example, mobile computing devices, such as smartphones can utilize a cellular network to access the network 112.

In the depicted example, the back-end systems 106, 108, 110 each include at least one server system 120. In some examples, the at least one server system 120 hosts one or more computer-implemented services that users can interact with using computing devices. For example, components of enterprise systems and applications can be hosted on one or more of the back-end systems 106, 108, 110. In some examples, a back-end system can be provided as an on-premise system that is operated by an enterprise or a third party taking part in cross-platform interactions and data management. In some examples, a back-end system can be provided as an off-premise system (e.g., cloud or on-demand) that is operated by an enterprise or a third-party on behalf of an enterprise.

In some examples, the computing devices 102, 104 each include computer-executable applications executed thereon. In some examples, the computing devices 102, 104 each include a web browser application executed thereon, which can be used to display one or more web pages of platform running application. In some examples, each of the computing devices 102, 104 can display one or more GUIs that enable the respective users 116, 118 to interact with the computing platform.

In some implementations, the blockchain network 114 is provided by a third-party provider. In some examples, the blockchain network 114 is one of a permissionless blockchain network, and a permissioned blockchain network. In general, in a permissionless blockchain network, the identity of participants can be obfuscated (e.g., pseudonymous, anonymous), and anyone can participate, read all transactions, participate in the process of block verification to create consensus (described in further detail herein), and the like. In general, in a permissioned blockchain network, all participants are known, approved, and governed.

The blockchain network 114 is provided as a peer-to-peer network including a plurality of nodes 130, at least some of which immutably record information in a blockchain 132 and/or a blockchain 134 (distributed ledgers). That is, the blockchain network 114 can maintain multiple blockchains. Further, for each blockchain 132, 134, multiple copies of the blockchain 132, 134 are provided and maintained across the blockchain network 114. For example, multiple nodes 130 each store a copy of the blockchain 132 and multiple nodes 130 each store a copy of the blockchain 134.

Although a single blockchain network 114 is depicted, it is contemplated that multiple blockchain networks can be used within a mobility ecosystem. Example blockchain networks include Corda and HyperLedger Fabric. For example, an issuing authority can record attestations to a blockchain network, while another issuing authority can record attestations to another blockchain network. For example, a blockchain network can be provided to digitally record a vehicle title and/or transactions associated with the vehicle title as attestations from a DMV as an issuing authority. Another blockchain network can be provided to digitally record an insurance policy as an attestation from an insurance company as an issuing authority. Each of the blockchain networks can be accessed to verify attestations. For example, an authenticity of the title can be verified by the respective blockchain network. For example, a hash value can be generated for the title and can be compared to a hash value provided as the digital recording of the title within the respective blockchain network. If the hash values match, the title is determined to be authentic. If the hash values do not match, the title is determined not to be authentic.

In the context of the present disclosure, the back-end system 110 can host a centralized database system to record attestations of an issuing authority. An example centralized database system can include, without limitation, MongoDB. For example, a maintenance log can be recorded by a repair facility within the centralized database system.

In accordance with implementations of the present disclosure, the blockchain network 114 can be a component of the DVIN. For example, and as described in further detail herein, the DVIN leverages the blockchain network 114 to immutably record identifiers assigned to entities within a mobility ecosystem (e.g., identifiers assigned to OEMs, vehicles, owners). In some examples, the DVIN stores standards definitions and schemas of one or more external systems. For example, the external systems can be disparate systems that operate using disparate standards and/or schemas. Example external systems include other blockchain networks and centralized database systems. The DVIN leverages the respective standards and schemas to communicate with each of the one or more external systems to function as a gateway for issuing authorities and/or verifying entities to access the one or more external systems. In this manner, and as described in further detail herein, the DVIN enables interoperability within the mobility ecosystem.

As described in further detail herein, the DVIN of the present disclosure is implemented within a mobility network that leverages one or more standards and one or more governance frameworks. An example mobility network includes, without limitation, the Open Mobility Network (OMN), which can be described as an automation network that provides a neutral platform for multi-party application development and enables entities within a mobility ecosystem to share transportation data, manage mobility service transactions, and exchange identity and usage information within a trusted service network. Example standards include, without limitation, the vehicle identity (VID) standard and the verifiable credentials standard. The VID standard is developed by the Mobility Open Blockchain Initiative (MOBI) to provide decentralized identifiers (DIDs) for entities, such as vehicles (e.g., cars, trucks, planes, boats, trains). The verifiable credentials standard is developed by the W3C Verifiable Credentials Working Group to provide a mechanism to express credentials (e.g., passport, drivers license, diploma) on the Internet in a cryptographically secure, privacy-preserving, and machine-verifiable manner. An example governance framework includes, without limitation, the Communications Business Automation Network (CBAN) governance framework, which supports shared services, distributed ledger systems, standardized terminology, and interoperable protocols.

The DVIN of the present disclosure supports an ecosystem of applications in the mobility context. Example applications can include, without limitation, digital ownership, trusted vehicle maintenance, supply chain, service marketplaces (e.g., parking, fueling, charging, tolls), digital keys, finance, and insurance. That is, the DVIN of the present disclosure supports vehicle-to-anything (V2X) connections, such as, without limitation, vehicle-to-vehicle (V2V), vehicle-to-infrastructure (V2I), and vehicle-to-business (V2B). The DVIN of the present implements one or more distributed ledger systems and digital twins to enable interoperability between disparate systems (e.g., disparate distributed ledger systems, traditional database systems) leveraged by various entities active in the mobility network. For example, and as described in further detail herein, the DVIN of the present disclosure supplements traditional systems of storing entity information (e.g., owner information, vehicle information, supplier information) in disparate data sources (e.g., government data source, OEM data source, insurance data source) with a peer-to-peer decentralized distributed ledger system. That is, the DVIN of the present disclosure records DIDs of entities active within the mobility network and enables interoperability within the mobility network by functioning as a gateway between entities (e.g., issuing authorities, verifiers) and disparate data sources (e.g., distributed ledger systems, centralized databases) in a standardized manner.

In some implementations, the DVIN assigns DIDs to entities. For example, in response to production of a vehicle, an OEM can issue vehicle creation form (e.g., a vehicle birth certificate) and a DID (e.g., VID) is generated and stored by the DVIN at least partially based on data recorded in the vehicle creation form. The DID can be used to uniquely identify the entity across all data sources participating in the mobile network. In some implementations, the DVIN generates a digital twin of the entity, which can be used to record a history of the entity since inception to the mobile network.

Figure 2:
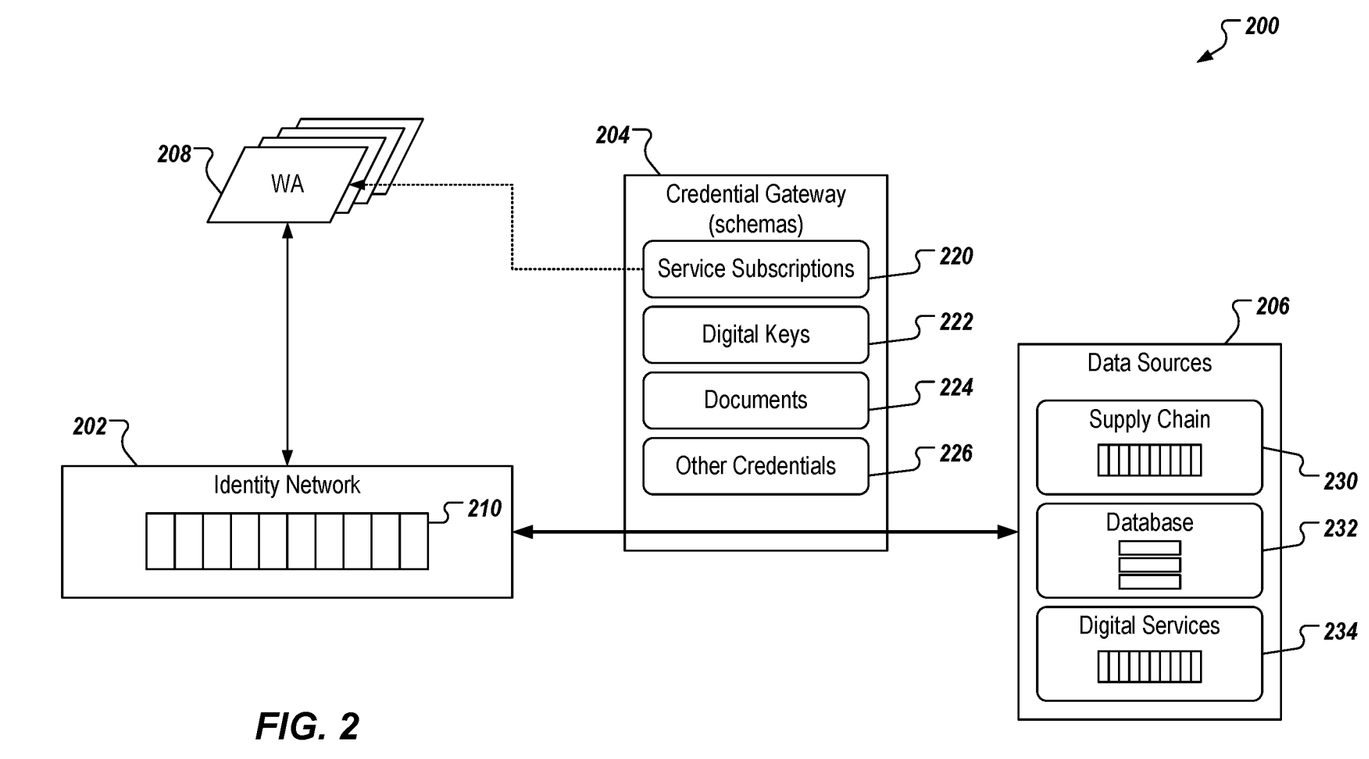
FIG. 2 depicts a block diagram of a mobility ecosystem that is enabled using a digital vehicle identity network in accordance with implementations of the present disclosure.

FIG. 2 depicts a block diagram of a mobility ecosystem 200 that is enabled using a DVIN in accordance with implementations of the present disclosure. In the example of FIG. 2, the mobility ecosystem 200 includes an identity network 202 (e.g., the DVIN of the present disclosure), a credential gateway 204, a set of data sources 206, and a set of wallet applications 208. In accordance with implementations of the present disclosure, the identity network 202 includes one or more blockchains 210 and functions as an interoperability bridge between entities and data sources in the set of data sources to enable entities to efficiently participate in the mobility network. For example, and as described in further detail herein, the identity network 202 enables an entity to authenticate the identity data in real-time without the entity manually authenticating at the original data source. That is, entities can connect to the identity network 202 to query each of the multitude of data sources in the set of data sources 206. In this manner, each entity need not record or otherwise be aware of end-points for each of the data sources, connection requirements, query formats and the like. Instead, a single connection is used, the connection to the identity network 202.

In further detail, each wallet application 208 is assigned to a respective entity (e.g., user, vehicle). The wallet application 208 functions as a digital wallet to store data to be used by the respective entity. In the context of the present disclosure, a digital wallet can be described as a computer-executable application that enables a respective entity (owner of the digital wallet) to execute electronic transactions (e.g., transfer of title to goods, payment of services). In some examples, each wallet application 208 is associated with a DID of the respective entity and stores, among other things, one or more attestations (e.g., credentials) associated with the entity and one or more payment mechanisms (e.g., digital payment using crypto-currencies, credit cards, debit cards). For example, in the case of a vehicle, the wallet application 208 is associated with the VID (DID) assigned to the vehicle.

As depicted in FIG. 2, the credential gateway 208 is representative of multiple activities and/or applications that are active within the mobility network. Example activities and/or applications include service subscriptions 220, digital keys 222, documents 224 (e.g., title, registration, proof of insurance), and other credentials 226 (e.g., driver license, diploma). In some examples, service subscriptions 220 can include one or more services that an entity is subscribed to. In the context of a mobility network, example services can include, without limitation, parking, fueling, charging, and tolls. That is, for example, payment for a service can be made by the entity through the wallet application 208 of the entity, the wallet application 208 providing a credential (e.g., DID) evidencing that the entity is authorized to access the service and a payment mechanism to pay for the service. For example, a vehicle can use its wallet application 208 to provide a VID, which can be authenticated for access to a service (e.g., parking), and, assuming the vehicle is authenticated, the service can be provided and payment can be made from the wallet application 208. As another example, an owner of a vehicle can use a digital key to access and operate a vehicle, the owner being authenticated based on a DID assigned to the owner and, assuming the owner is authenticated, the vehicle can be operated.

Authentication of entities can require communication with one or more of the data sources in the set of data sources 206. In some examples, data sources in the set of data sources 206 are disparate relative to one another and can include off-chain and on-chain data sources. In the example of FIG. 2, a first data source 230, a second data source, and a third data source 234 are depicted. In this example, the first data source 230 includes a first blockchain network (i.e., is an on-chain data source), the second data source 232 includes a centralized database system (i.e., is an off-chain data source), and the third data source 230 includes a second blockchain network (i.e., is an on-chain data source). In this example, the first blockchain network (e.g., Hyperledger Fabric) is different from the second blockchain network (e.g., Corda). Consequently, the data sources in the set of data sources are disparate in that they operate using different standards and interfaces.

In the context of the present disclosure, the identity network 202 stores digital twins of entities (e.g., on the blockchain 210). An example digital twin can be provided for a vehicle, such as a car. In this example, the digital twin can be provided based on a standard, such as the VID standard provided by MOBI. In this manner, digital twins, for vehicles, are created in a standardized way. In some examples, the digital twin can include, among other information, an issuer's signature (e.g., a signature of an issuing authority), standardized information, and a hash of the data for auditing and immutability.

In some examples, the identity network 202 also stores a revocation registry that records, for example, credentials of entities that have been revoked by issuing authorities. For example, an issuing authority can provide an entity with credentials, which can be used to enable the entity to perform some task within the mobility network. In some instances, the credentials can be revoked, such that the entity is no longer able to perform the task. For example, an entity can be enrolled in a toll payment service and credentials can be issued (e.g., by a toll authority) to enable the entity to use a toll road and make payment for use. At some point, the entity is to no longer user the toll road (e.g., the entity is a vehicle that has had an ownership transfer). Consequently, the credentials of the entity for the toll payment service can be revoked and the revocation is recorded in the revocation registry.

Figure 3:
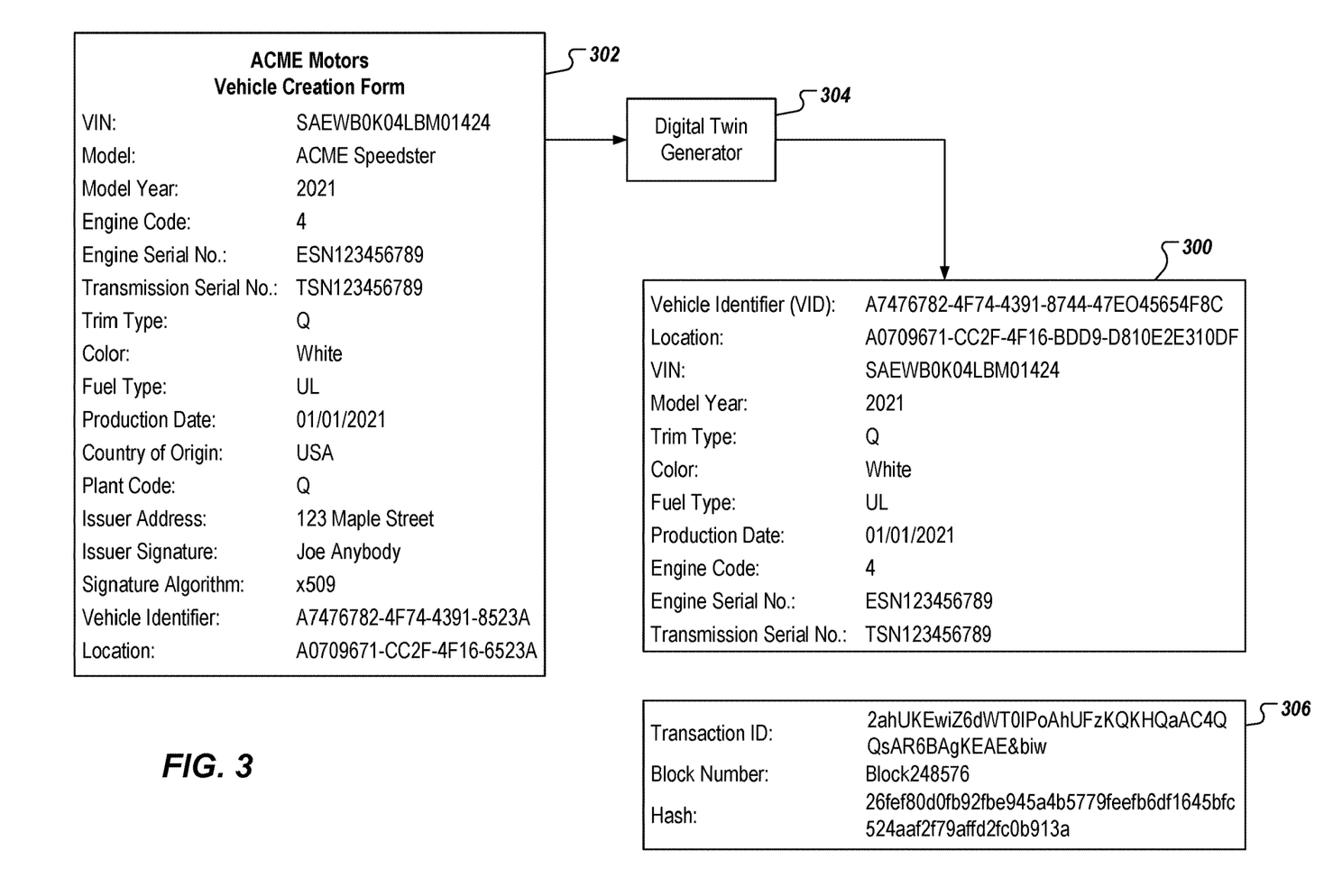
FIG. 3 depicts an example digital twin in accordance with implementations of the present disclosure.

FIG. 3 depicts an example digital twin 300 in accordance with implementations of the present disclosure. The digital twin 300 of FIG. 3 is representative of a vehicle as an entity that is active in a mobility network. In some examples, the digital twin 300 is generated from a vehicle creation form 302 by a digital twin generator 304 (e.g., included in the identity network 202 of FIG. 2). In some examples, the vehicle creation form 302 is a computer-readable file that is generated by an OEM (e.g., a producer of the vehicle) and is signed by the OEM as an issuing authority. In some examples, the signature is provided as a public key (e.g., x.509 public key certificate) of the OEM, which provided using a cryptographic routine (e.g., x.509).

In some examples, the digital twin generator 304 processes the vehicle creation form 302 to provide the digital twin 300 to conform with a standard, such as the VID standard. Further, the digital twin 300 is recorded to a distributed ledger (e.g., the blockchain 210 of the identity network 202) and data 306 evidencing the recording is provided.

As introduced above, the digital twin 300 functions as a virtual model of a respective, real-world vehicle and is connected to the vehicle using a digital thread. In this manner, any digital transactions that the vehicle is involved in can be recorded to the digital twin 300. In some examples, a transaction is executed and is recorded to a respective data source and is recorded in the digital twin 300. For example, and without limitation, a title transfer can occur, in which the title to the vehicle is transferred from a first entity to a second entity. The title transfer can be stored as a transaction within a data source (e.g., a distributed ledger system, centralized database) of an issuing authority (e.g., a DMV that records the title transfer in a blockchain network). The title transfer is also recorded in the digital twin 300. For example, data representative of the title transfer (e.g., transaction identifier, block number) as recorded in the data source (e.g., blockchain network) is recorded in the digital twin 300. In some examples, recording of the title transfer in the digital twin 300 is itself recorded in the blockchain 210 of the identity network 202. In this manner, an immutable history of the vehicle is recorded in the digital twin 300 and transactions of that history can be authenticated using the blockchain 210 and/or the data source of the issuing authority.

Figure 4:
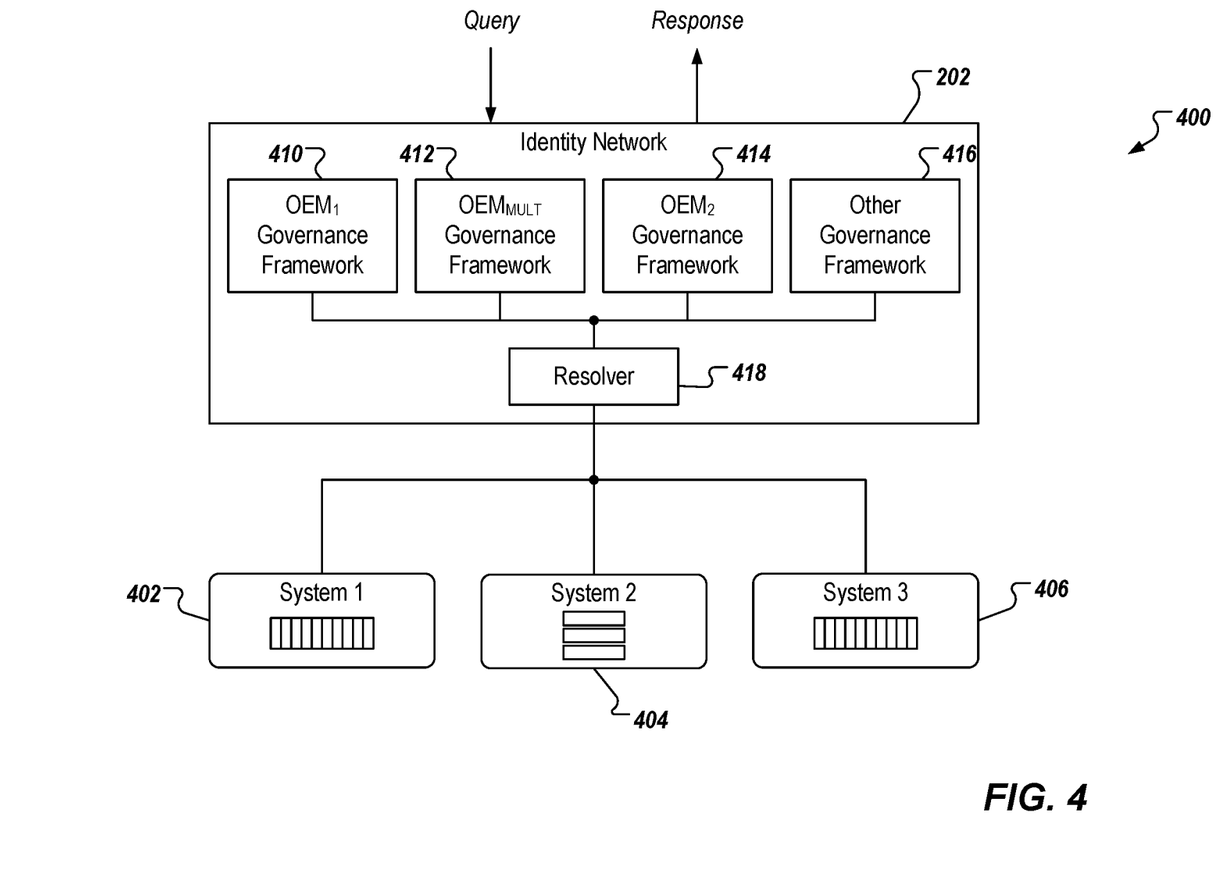
FIG. 4 depicts a block diagram of a digital vehicle identity network in accordance with implementations of the present disclosure.

FIG. 4 depicts a block diagram 400 of a DVIN in accordance with implementations of the present disclosure. In the example of FIG. 4, the identity network 202 enables communication with a first system 402, a second system 404, and a third system 406. As described above, the identity network 202 includes one or distributed ledgers, within which public DIDs are stored alongside definitions of standards (e.g., the VID standard) and schemas (e.g., schemas of the credential gateway 204). The identity network 202 also stores digital twins (e.g., the digital twin 300 of FIG. 3) of entities that operate in the mobility network.

In accordance with implementations of the present disclosure, the identity network 202 enables entities, such as OEMs, to setup local governance frameworks (within their respective organization) that respect the standards and governance framework. More particularly, and as depicted in FIG. 4, the identity network 202 includes sub-governance frameworks 410, 412, 414, 416 that enables multiple entities to participate in the identity network 202, while preserving confidential information. In some examples, each sub-governance framework 410, 412, 414, 416 is stored on a blockchain (e.g., Hyperledger Indy) of the identity network. In some examples, each sub-governance framework 410, 412, 414, 416 stores DIDs (e.g., VIDs) issued by respective issuing authorities (e.g., OEMs).

In the example of FIG. 4, the sub-governance framework 410 is provided for a first OEM, the sub-governance framework 412 is provided for multiple OEMs, the sub-governance framework 414 is provided for a second OEM, and the sub-governance framework 416 is provided for another entity (e.g., insurance, finance, government agency). The use of sub-governance frameworks enables obfuscation of information. For example, the number of DIDs (e.g., VIDs) issued by one OEM can be obfuscated, while allowing the identity network to resolve DIDs. In this manner, an OEM's insight into confidential information of other OEMs, such as production volumes, is inhibited.

In the example of FIG. 4, the identity network 202 includes a resolver 418 that routes DID-queries of external systems to the correct system of the first system 402, the second system 404, and the third system 406. For example, and as discussed by way of example herein, a government agency (i.e., an external system) can issue a DID query to the identity network 202 to query ethical sourcing of a component of a vehicle using the DID (VID) of the vehicle. The resolver 418 routes the DID query to the first system 402, which, in this example, is of a supply chain entity that supplies the component. In some examples, a response to the DID query can be returned to the resolver 418 and on to the government agency (e.g., a government agency providing tax breaks for vehicles having ethically sourced components).

In some examples, the resolver 418 includes indexes the DIDs and attestations (transactions) to identify a respective data source that a query is to be directed to. In some examples, a query includes a DID and an attestation that are indexed to determine a data source that recorded the transaction for the respective DID. In some examples, indexing can include determining which sub-governance framework 410, 412, 414, 416 corresponds to the DID (e.g., which OEM issued the DID to the entity). Connection information and format can be provided from the sub-governance framework 410, 412, 414, 416 that is identified as corresponding to the DID. Using this information, the resolver 418 can resolve the query to provide a resolved query that is transmitted to the data source (e.g., on of the first system 402, the second system 404, and the third system 406), which provides a response to the resolved query. For example, the resolved query can be provided in the format expected by the respective data source and can be transmitted to an end-point defined for the data source, the resolved query including the attestation and other information for authenticating the attestation by the data source. The identity network 202 provides the response to the entity that issued the query. Example use cases including queries and responses are described herein with reference to FIG. 5.

Figure 5:
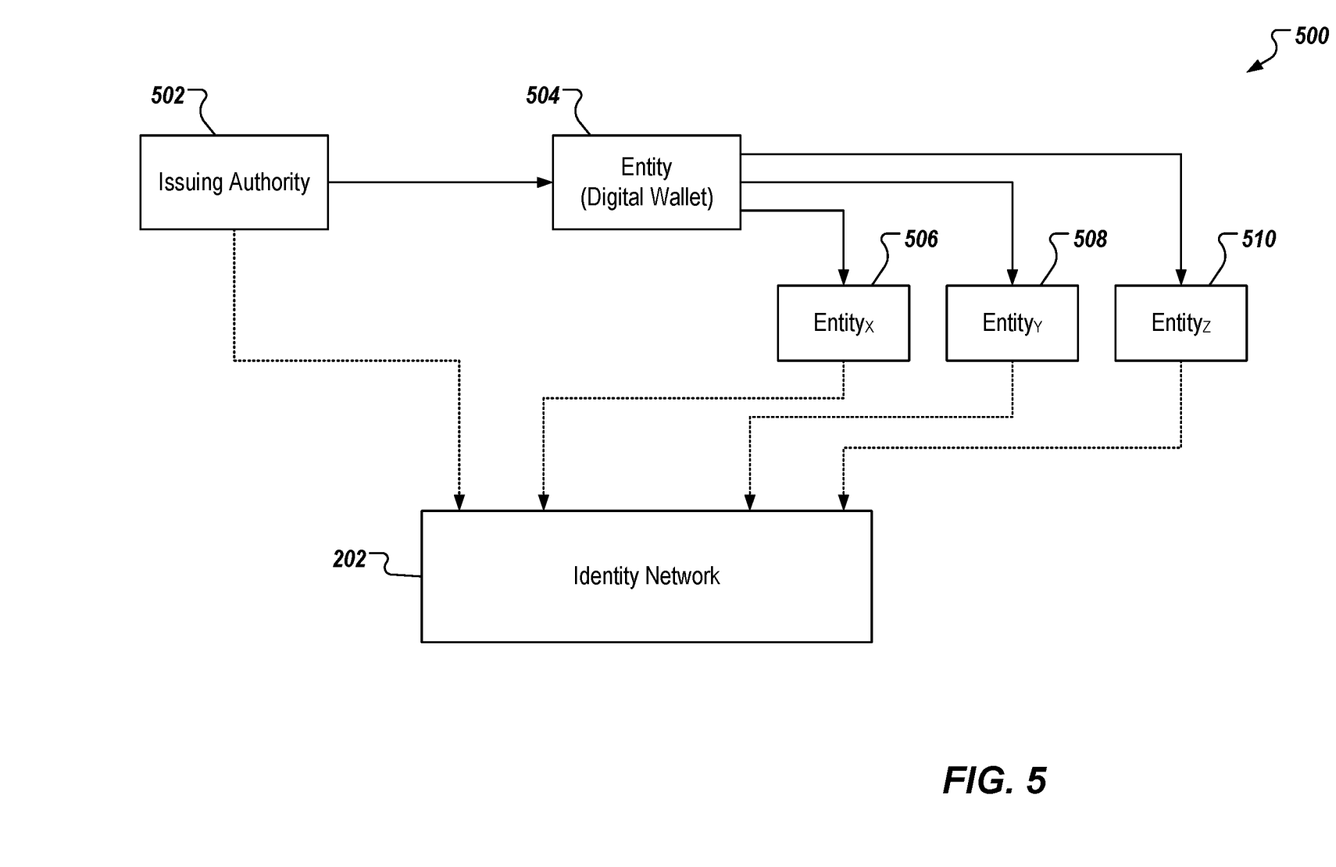
FIG. 5 depicts a block diagram representative of example use cases in accordance with implementations of the present disclosure.

FIG. 5 depicts a block diagram 500 representative of example use cases in accordance with implementations of the present disclosure. The example of FIG. 5 includes an issuing authority 502, an entity 504, a first entity 506, a second entity 508, a third entity 510, and the identity network 202.

In a general use case, the issuing authority 502 publishes DIDs (e.g., DIDs that the issuing authority has assigned), one or more credential schemas, one or more credential definitions, and one or more identifiers (e.g., end-points) of data sources to the identity network 202. The issuing authority 502 issues an identity attestation to the entity 504, which can be recorded in a digital wallet (e.g., wallet application) of the entity 504. In some examples, the identity attestation includes a DID. The entity 502 presents a verifiable claim to one or more of the first entity 506, the second entity 508, and the third entity 510. In some examples, the verifiable claim includes a DID and an attestation that is to be verified for authenticity. The one or more of the first entity 506, the second entity 508, and the third entity 510 transmit a query (authentication request) to the identity network 202, which processes the query, as described herein, to provide a response. In some examples, the response indicates that the DID and/or the attestation are authentic. In some examples, the response indicates that the DID and/or the attestation are not authentic.

A first example use case includes proof of ownership. In the first example use case, the issuing authority 502 is an OEM that produces a vehicle, the entity 504 is an owner of the vehicle (or can be the vehicle itself), and the first entity 506 is a government agency that issues ownership documents (e.g., title, registration). In this first example use case, the issuing authority publishes DID, credential schemas, and credential definitions to the identity network 202, which enable verifiers to understand the format of verifiable claims, such as proof of ownership. Upon purchase of the vehicle (e.g., from a dealer), a proof of ownership is issued to the entity 504 and the proof of ownership and issuance thereof are digitally recorded in a data source (e.g., a blockchain network). In some examples, the proof of ownership includes the VIN, the make, the model, the year, the owner (e.g., DID of the entity 504), the purchase date, and the like of the vehicle. A proof of ownership claim is presented to the first authority 506 in an effort to obtain ownership documents. The first authority 506 queries the identity network 202 to ensure that the proof of ownership was issued by a trusted authority and that the proof of ownership has not been revoked. The identity network 202 processes the query and issues a response to the first entity 506. In some examples, if the response indicates that the proof of ownership is authentic and has not been revoked, the first entity 506 can issue the ownership documents. Here, the first entity 506 itself becomes an issuing authority with respect to the ownership documents, which can be recorded in a data source (e.g., a blockchain network). The ownership documents can then, in turn, be presented as a verifiable claim to another entity, such as an insurance company.

A second example use case includes ethical sourcing of materials. In the second example use case, the issuing authority 502 is authorized to issue standardized attestation of ethical sourcing of materials (e.g., cobalt), the entity 504 is a supplier that manufactures components using the materials, the second entity 508 is a governmental entity (e.g., regulatory entity) and the third entity 510 is a supply chain entity (e.g., the OEM). In this second example use case, the issuing authority publishes DID, credential schemas, and credential definitions to the identity network 202, which enable verifiers to understand the format of verifiable claims. The issuing authority 502 issues a standardized attestation of ethical sourcing to the entity 504. In some examples, the attestation includes a DID, part identifier, and other descriptions of a component that includes the ethically sourced materials. The attestation and issuance thereof are digitally recorded in a data source (e.g., a blockchain network). The entity 504 presents the attestation to the second entity 508, which can verify the attestation and absence of revocation of the attestation by querying the identity network 202. In some examples, the second entity 508 can issue a certificate of compliance (CoC), and the CoC and issuance thereof are digitally recorded in a data source (e.g., a blockchain network). The entity 504 presents the attestation and/or the CoC to the third entity 510, which can verify the authenticity of the attestation and/or the CoC, and absence of revocation of either, by querying the identity network 202. In this manner, a chain of ethical sourcing is evidenced along the supply chain of a vehicle.

Figure 6:
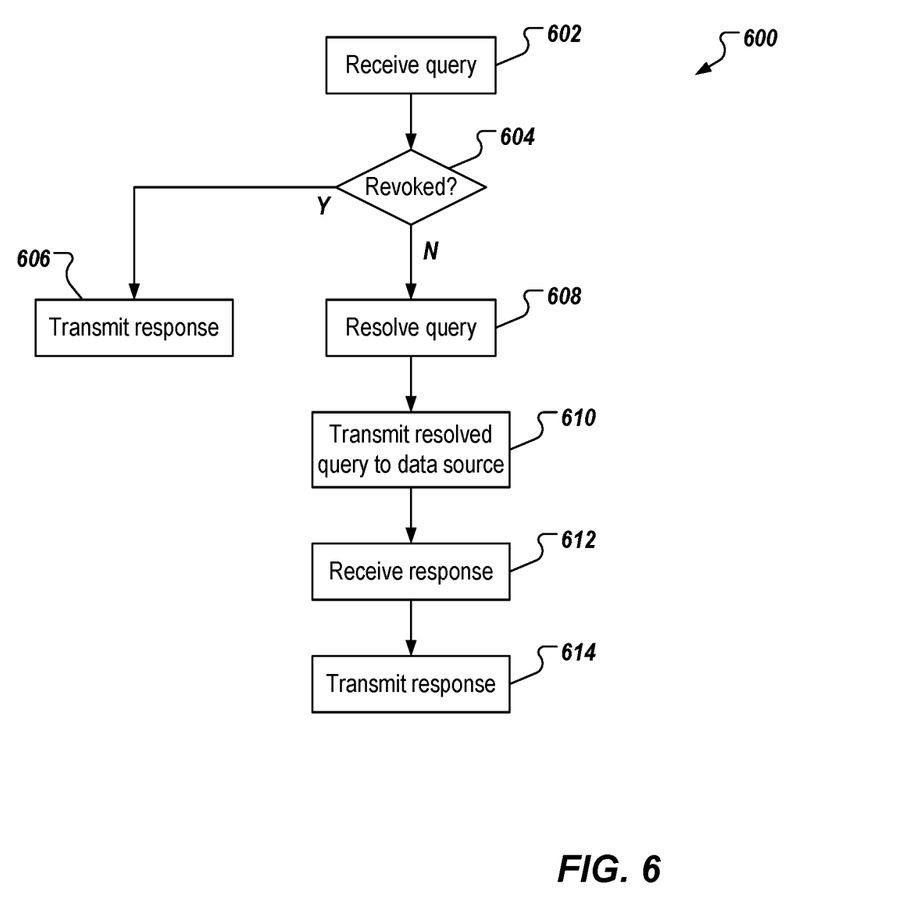
FIG. 6 depicts an example process that can be executed in accordance with implementations of the present disclosure.

FIG. 6 depicts an example process that can be executed in accordance with implementations of the present disclosure. In some examples, the example process 600 is provided using one or more computer-executable programs executed by one or more computing devices.

A query is received (602). For example, and as described herein with reference to FIG. 5, a verifying entity 506, 508, 510 transmits a query to the identity network 202, the identity network 202 receiving the query. In some examples, the query includes an identifier that uniquely identifies an entity that is active in the mobility network and an attestation that is to be authenticated. It is determined whether the attestation has been revoked (604). For example, and as described herein, the identity network 202 references a revocation registry to determine whether the attestation has been revoked. If it is determined that the attestation has been revoked, a response is transmitted (606). For example, a response is transmitted to the verifying entity 506, 508, 510, the response indicating that the attestation has been revoked.

If it is determined that the attestation has not been revoked, the query is resolved (608). For example, and as described herein, the identity network resolves the query to provide a resolved query that includes the attestation. In some examples, resolving the query at least partly includes identifying a data source of a set of data sources that is to be queried to authenticate the attestation. The resolved query is transmitted to the data source (610). For example, and as described herein, the identity network transmits the resolved query to the data source. A response is received (612). For example, and as described herein, the data source returns a response to the resolved query to the identity network. The response is transmitted (614). For example, and as described herein, the identity network 202 transmits the response to the verifying entity. In some examples, the response indicates whether the attestation is authentic.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the to be filed claims.

What is claimed is:

1. A computer-implemented method for authenticating attestations in a mobility network, the method being executed by one or more processors and comprising:
   receiving, by an identity network and from a verifying entity, a query to authenticate an attestation, the query comprising an identifier that uniquely identifies an entity that is active in the mobility network and the attestation that is to be authenticated, the identity network being a bridge between multiple issuing authorities that issue attestation and multiple verifying entities;
   resolving, by the identity network, the query to provide a resolved query, the resolved query comprising the attestation, resolving at least partly comprising identifying a data source of a plurality of data sources that is to be queried to authenticate the attestation,
   wherein, resolving the query further comprises determining connection information corresponding to the identifier from a sub-governance framework of a set of sub-governance frameworks within the identity network,
   wherein each sub-governance framework corresponds to an issuing authority that issues attestations representing activities within the mobility network, and
   wherein the sub-governance framework includes Communications Business Automation Network (CBAN) governance framework, which supports shared services, distributed ledger systems, standardized terminology, and interoperable protocols;
   transmitting, by the identity network, the resolved query to the data source;
   receiving, by the identity network, a response to the resolved query; and
   transmitting, by the identity network, the response to the verifying entity.

2. The method of claim 1, wherein the identity network stores a digital twin of the entity, the digital twin recording a history of the entity.

3. The method of claim 1, wherein the identifier conforms to the vehicle identity (VID) standard.

4. The method of claim 1, wherein the data source comprises a distributed ledger system that records data associated with the attestation to authenticate the attestation.

5. The method of claim 1, wherein the identifier comprises a decentralized identifier (DID) that is stored in a distributed ledger of the identity network.

6. A non-transitory computer-readable storage medium coupled to one or more processors and having instructions stored thereon which, when executed by the one or more processors, cause the one or more processors to perform operations for authenticating attestations in a mobility network, the operations comprising:
   receiving, by an identity network and from a verifying entity, a query to authenticate an attestation, the query comprising an identifier that uniquely identifies the entity that is active in the mobility network and the attestation that is to be authenticated, the identity network being a bridge between multiple issuing authorities that issue attestation and multiple verifying entities;
   resolving, by the identity network, the query to provide a resolved query, the resolved query comprising the attestation, resolving at least partly comprising identifying a data source of a plurality of data sources that is to be queried to authenticate the attestation,
wherein resolving the query further comprises determining connection information corresponding to the identifier from a sub-governance framework of a set of sub-governance frameworks within the identity network;
wherein each sub-governance framework corresponds to an issuing authority that issues attestations representing activities within the mobility network, and
wherein the sub-governance framework includes Communications Business Automation Network (CBAN) governance framework, which supports shared services, distributed ledger systems, standardized terminology, and interoperable protocols;
transmitting, by the identity network, the resolved query to the data source;
receiving, by the identity network, a response to the resolved query; and
transmitting, by the identity network, the response to the verifying entity.

7. The non-transitory computer-readable storage medium of claim 6, wherein the identity network stores a digital twin of the entity, the digital twin recording a history of the entity.

8. The non-transitory computer-readable storage medium of claim 6, wherein the identifier conforms to the vehicle identity (VID) standard.

9. The non-transitory computer-readable storage medium of claim 6, wherein the data source comprises a distributed ledger system that records data associated with the attestation to authenticate the attestation.

10. The non-transitory computer-readable storage medium of claim 6, wherein the identifier comprises a decentralized identifier (DID) that is stored in a distributed ledger of the identity network.

11. A system, comprising:
a computing device; and a computer-readable storage device coupled to the computing device and having instructions stored thereon which, when executed by the computing device, cause the computing device to perform operations for authenticating attestations in a mobility network, the operations comprising:
receiving, by an identity network and from a verifying entity, a query to authenticate an attestation, the query comprising an identifier that uniquely identifies the entity that is active in the mobility network and the attestation that is to be authenticated, the identity network being a bridge between multiple issuing authorities that issue attestation and multiple verifying entities;
resolving, by the identity network, the query to provide a resolved query, the resolved query comprising the attestation, resolving at least partly comprising identifying a data source of a plurality of data sources that is to be queried to authenticate the attestation,
wherein resolving the query further comprises determining connection information corresponding to the identifier from a sub-governance framework of a set of sub-governance frameworks within the identity network;
wherein each sub-governance framework corresponds to an issuing authority that issues attestations representing activities within the mobility network, and
wherein the sub-governance framework includes Communications Business Automation Network (CBAN) governance framework, which supports shared services, distributed ledger systems, standardized terminology, and interoperable protocols;
transmitting, by the identity network, the resolved query to the data source;
receiving, by the identity network, a response to the resolved query; and
transmitting, by the identity network, the response to the verifying entity.

12. The system of claim 11, wherein the identity network stores a digital twin of the entity, the digital twin recording a history of the entity.

13. The system of claim 11, wherein the identifier conforms to the vehicle identity (VID) standard.

14. The system of claim 11, wherein the data source comprises a distributed ledger system that records data associated with the attestation to authenticate the attestation.

* * * * *